Oct. 11, 1927.
G. W. McKEE
1,645,506
TEMPERATURE REGULATOR FOR FURNACES AND THE LIKE
Filed April 14, 1924
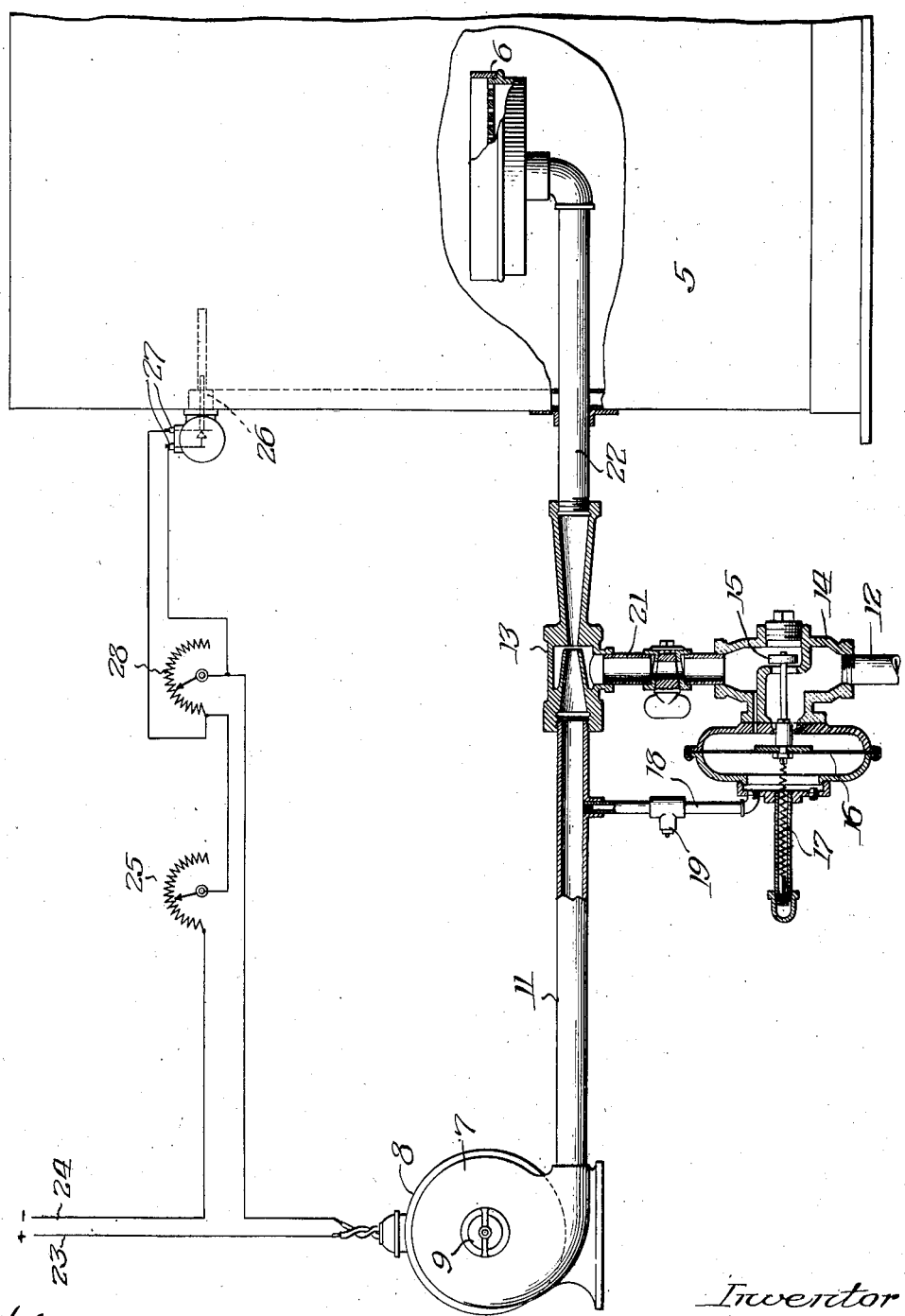
Inventor
Garnet W. McKee Patented Oct. 11, 1927.

1,645,506

UNITED STATES PATENT OFFICE.

GARNET W. McKEE, OF ROCKFORD, ILLINOIS.

TEMPERATURE REGULATOR FOR FURNACES AND THE LIKE.

Application filed April 14, 1924. Serial No. 706,292.

This invention pertains to the regulation of the temperature in a gas fired furnace or other similar apparatus and has more particular reference to improvements whereby this regulation is effected.

Instead of employing a common air supply pipe through which air under pressure may be supplied to a number of furnaces or similar apparatuses, the air being mixed with gas to produce a combustible mixture of the proper proportions for each furnace, it is desirable in many instances to provide an undividual air and gas supply unit for each furnace so that the furnaces may be individually operated and controlled independently of each other.

It has heretofore been proposed to employ an individual electrically operated fan blower for supplying the air under pressure to the furnaces and to control the temperature by throttling the flow of air either at the intake or beyond the delivery of the blower, the gas flow being dependent upon and controlled by the flow of air. The blowers employed for this purpose have customarily been operated by universally wound electric motors which were quite satisfactory in operation so long as the fan was operating under a substantial load. When the air supply, however, was throttled for turn down purposes either at the intake side of the blower or in the discharge line therefrom, the consequent reduction in the volume of air handled would so reduce the load on the blower that the motor would race and burn out its brushes and commutator and sometimes the bearings in a comparatively short period of time.

One of the primary purposes of my present invention is to provide a control for the motor itself so that instead of throttling the air flow for turn down purposes the speed of the motor is reduced, thus diminishing the amount of air delivered by the fan and consequently effecting the desired turn down result at the burner without permitting racing of the motor or injury thereto.

For the purpose of facilitating an understanding of my invention I have illustrated on the accompanying drawing a preferred embodiment thereof, from inspection of which, when considered with the following description, my invention and many of its contended advantages should be readily understood and appreciated.

On the drawing,—

The single figure is a side elevation somewhat diagrammatic in character, of a regulator embodying my invention.

Referring to the drawings more in detail, reference character 5 indicates generally a furnace or other apparatus of any preferred construction adapted to be heated by the combustion of a properly proportioned mixture of air and gas issuing from one or more burners 6. The air for the mixture is supplied by a fan blower 7 driven by a direct connected electric motor indicated generally by reference character 8. The air enters the blower through a central intake opening 9, which, if desired, may be equipped with an adjustable shutter and issues from the blower through a discharge pipe 11. The fuel, preferably gas, is received from any suitable source of supply through the pipe 12. The gas from the pipe 12 is mixed with air from the pipe 11 to produce a combustible mixture of predetermined proportions and irrespective of fluctuations in pressures of both the air and the gas by any suitable proportional mixing apparatus, the particular form shown herein for illustrative purposes being the subject-matter of my pending application Serial No. 690,333, filed February 2, 1924. This apparatus will be described herein, therefore, only to such an extent as may be necessary for the understanding of my present invention.

The air pipe 11 is shown as connected into a mixer of suitable construction and the gas pipe 12 is connected with the casing 14 of an apparatus commercially known as a zero governor. This governor comprises a valve 15 for regulating the flow of gas, the valve being controlled by a diaphragm 16 and held against its seat when no pressure is exerted upon the outer face of the diaphragm, by a spring 17. The valve is opened in proportion to the pressure exerted upon the outer face of the diaphragm by air conducted from the pipe 11 through a branch pipe 18 which is equipped with a regulated outlet orifice 19 which effects a predetermined reduction in the air pressure flowing through the pipe 18 so that the pressure exerted upon the diaphragm 16 bears a predetermined ratio to the air pressure in the pipe 11. The gas is delivered into the mixer through the pipe 21 and the resultant mixture of air and gas is delivered to the burner 6 through the pipe 22. The whole mixing apparatus is so designed that the mixture delivered to the burner will comprise predetermined proportions of air and gas irrespective of the volume of mixture delivered.

For the purpose of regulating the speed of the blower and consequently the volume of air and gas delivered to the burner, I have provided control means which will now be described. The motor is supplied with current through the main leads 23 and 24 and in the lead 24 I have interposed a rheostat 25 which can be manually adjusted to fix the maximum speed at which the motor will operate. The maximum volume of combustible mixture which will be delivered to the burner is, therefore, determined by the setting of this rheostat. In the furnace or other apparatus to be heated there is disposed a pyrometer 26 of any well known or preferred construction adapted to open and close an electric circuit, that is, when the temperature to which the pyrometer is subjected is below a predetermined point for which the pyrometer is set the circuit will be closed and when the temperature exceeds this predetermined point the circuit is automatically opened. Electric pyrometers for this purpose being commercial articles detailed description thereof is not believed to be necessary. The pyrometer is connected in series in the main lead 24 as shown on the drawing, the connection being established through the binding posts 27 of the pyrometer.

In parallel with the pyrometer there is interposed in the main lead 24 a second rheostat 28 which is adjusted to determine the minimum speed at which the blower motor will operate. When the circuit is closed through the pyrometer the current will flow around the rheostat 28 and the motor will operate at maximum speed determined by the resistance introduced through the rheostat 25. When, however, the circuit through the pyrometer is opened the rheostat 28 will cut in and the speed of the motor will be reduced to a point determined by the setting of the rheostat 28.

In the operation of my invention, assuming that the furnace is to be initially heated up, the circuit through the pyrometer will be closed and the motor will operate at maximum speed to deliver the maximum volume of air and gas mixed therewith to the burner. When the temperature in the furnace has been raised to a point above that for which the pyrometer is set the circuit through the pyrometer will open, thus cutting in the rheostat 28 and the additional resistance interposed in the circuit will reduce the motor speed to a predetermined minimum determined by the setting of the rheostat 28. The volume of the air and mixture delivered to the burner will consequently be reduced to a predetermined minimum and the burner will operate in turned down condition. Since no throttling of the air supplied to the blower or of the air discharged from the blower is performed, any tendency of the blower and motor to race with resultant injury to the motor is obviated. The supply of fuel to the burner is, therefore, controlled by regulating the speed of the blower and the apparatus will function efficiently at all times without danger of injury to the motor.

While I have shown and described a preferred embodiment of the invention, obviously the details may be varied, and one form of variation which may be suggested is that instead of employing a series wound motor, two-speed motor without commutator may be employed, in which instance the pyrometer will serve to connect one or the other of the motor windings into the circuit so that the speed of the motor will be varied accordingly. Other modifications which will readily suggest themselves are contemplated within the scope of my invention as defined in the following claims.

I claim:

1. In a temperature regulator, the combination of a burner, means including an electrically driven blower for delivering air and gas to said burner, an electric circuit for driving said blower, a maximum speed variable resistance connected in series in said circuit, a minimum speed variable resistance interposed in said circuit, and a thermostatically actuated switch connected in parallel with said minimum speed resistance whereby said last-named resistance is thrown into or cut out of said circuit upon the opening and closing respectively of said switch.

2. In an apparatus of the character described, the combination of electrically driven means for delivering air under pressure, a source of fuel supply, means for mixing said air and fuel, and a single contact temperature actuated switch for causing the said electrically driven means to operate at maximum speed or at minimum speed as desired.

3. In an apparatus of the character described, the combination of a burner, a source of fuel supply, an electrically driven blower, a maximum speed rheostat, a minimum speed rheostat, a thermostatic switch, said switch and rheostats being interposed in the electrical circuit of said blower, and a fuel mixing device adapted to supply gas in proportion to the air pressure variation and adapted to regulate the gas flow irrespective of variations in the gas pressure, said blower being arranged to operate at maximum speed below a given temperature and at minimum speed above a given temperature under control of said rheostats and switch.

4. In an apparatus of the character described, the combination of a device for proportionately mixing air and gas irrespective of variations in the pressure thereof, a blower, a single contact thermostatic switch, and a plurality of rheostats, said rheostats and switch being adapted to cause the blower to operate at a plurality of predetermined speeds.

5. In an apparatus of the character described, the combination of a burner, an electrically driven blower, a maximum speed rheostat, a minimum speed rheostat, a thermostatic switch, said switch and rheostats being interposed in the electrical circuit of said blower, and a source of fuel supply, said blower being arranged to operate at maximum speed below a given temperature and at minimum speed above a given temperature under control of said rheostats and switch.

GARNET W. McKEE.